(12) United States Patent
Kahle et al.

(10) Patent No.: US 9,121,533 B2
(45) Date of Patent: Sep. 1, 2015

(54) CRANKCASE VENTILATION FOR AN INTERNAL COMBUSTION ENGINE, TANK VENTILATION CONDUIT AND CONNECTION SYSTEM THEREFOR

(71) Applicant: A. Kayser Automotive Systems GmbH, Einbeck (DE)

(72) Inventors: Frank Kahle, Uslar (DE); Heiko Freter, Wenzen (DE)

(73) Assignee: A. Kayser Automotive Systems GmbH (DE)

( * ) Notice: Subject to any disclaimer, the term of this patent is extended or adjusted under 35 U.S.C. 154(b) by 0 days.

(21) Appl. No.: 14/156,008

(22) Filed: Jan. 15, 2014

(65) Prior Publication Data
US 2014/0209074 A1 Jul. 31, 2014

(30) Foreign Application Priority Data
Jan. 25, 2013 (DE) .......................... 10 2013 001 389

(51) Int. Cl.
| | |
|---|---|
| F02B 25/06 | (2006.01) |
| F16L 21/035 | (2006.01) |
| F16L 37/088 | (2006.01) |
| F01M 13/04 | (2006.01) |
| F01M 13/02 | (2006.01) |
| F02M 25/06 | (2006.01) |

(Continued)

(52) U.S. Cl.
CPC .............. *F16L 21/035* (2013.01); *F16L 37/088* (2013.01); *F01M 13/022* (2013.01); *F01M 13/023* (2013.01); *F01M 13/04* (2013.01); *F01M 13/0416* (2013.01); *F02M 25/06* (2013.01)

(58) Field of Classification Search
CPC ... F01M 13/04; F01M 13/022; F01M 13/023; F01M 13/0416; F02M 25/06

USPC .......................................................... 123/572
See application file for complete search history.

(56) References Cited

U.S. PATENT DOCUMENTS

| | | | | |
|---|---|---|---|---|
| 7,810,848 | B2 * | 10/2010 | Yoshino ......................... | 285/305 |
| 2008/0193300 | A1 * | 8/2008 | Markefka ....................... | 417/198 |
| 2008/0289353 | A1 * | 11/2008 | Maruya et al. .................. | 62/292 |
| 2009/0000668 | A1 * | 1/2009 | Roscher et al. ................ | 137/202 |

\* cited by examiner

FOREIGN PATENT DOCUMENTS

| | | |
|---|---|---|
| DE | 38 24 791 | 1/1990 |
| DE | 10 2011 118 790 | 5/2013 |

OTHER PUBLICATIONS

German Examination Report dated Sep. 11, 2013.

*Primary Examiner* — Lindsay Low
*Assistant Examiner* — Charles Brauch
(74) *Attorney, Agent, or Firm* — Gerald E. Hespos; Michael J. Porco; Matthew T. Hespos

(57) ABSTRACT

A crankcase ventilation for an internal combustion engine with a ventilation conduit which connects the crankcase of the internal combustion engine to an intake duct of the internal combustion engine, as well as a tank ventilation conduit and a connection system for a fluid conduit. The ventilation conduit comprises: a first pipe connector (10), and a second pipe connector (20) with a receiving chamber (24) into which the first pipe connector (10) is insertable, wherein a second groove (22) is formed in the receiving chamber (24), and the first pipe connector (10) has a first groove (12), wherein a compressible retaining ring (40) is inserted into the first groove (12), the compressible retaining ring being engageable with the second groove (22) when the first pipe connector (10) is inserted into the receiving chamber (24), or an expandable retaining ring is inserted into the second groove (22), the expandable retaining ring being engageable with the first groove (12) when the first pipe connector (10) is inserted into the receiving chamber (24).

20 Claims, 12 Drawing Sheets

CRANKCASE VENTILATION FOR AN INTERNAL COMBUSTION ENGINE, TANK VENTILATION CONDUIT AND CONNECTION SYSTEM THEREFOR

BACKGROUND

1. Field of the Invention

The present invention relates to a crankcase ventilation for an internal combustion engine as well as a tank ventilation conduit for a motor vehicle and a connection system for a fluid conduit containing fuel vapor or a combustion gas in a motor vehicle and comprising a non-detachable plug connection.

2. Description of the Related Art

Since many years, regulations require that ventilation means of the crankcase of internal combustion engines in motor vehicles are not connected to the atmosphere, but to the intake duct of the internal combustion engine such that combustion gases entering into the crankcase and engine oil mixed with the combustion gases can be sucked in and burned by the engine. In this way, a pollution of the environment due to leaking uncleaned combustion gases and leaking engine oil can be prevented.

As described for example in DE 38 24 791 A1, a ventilation conduit for a crankcase ventilation mostly comprises a conduit which is formed as a hose or pipe and leads from a crankcase ventilation point to the intake duct, such as the throttle body, of the internal combustion engine. However, if the ventilation conduit is not properly connected or is for example accidentally not being connected during repair or maintenance of the internal combustion engine, gases escape from the crankcase into the environment such that a pollution of the environment occurs. Due to increasingly stringent environmental regulations, such a situation must be prevented in a secure manner.

It has been contemplated to integrate sensors into the ventilation conduit, in order to detect an error state of the ventilation conduit based for example on a throughput or pressure variation and to record an error code and/or to activate a warning lamp. However, a safety device of this type is complicated and costly. In addition, such a safety device only provides information about the error state, but cannot prevent the internal combustion engine from being operated despite of the error and thus cannot prevent the environment from being adversely affected.

Accordingly, the same applies for conduits containing fuel vapor, such as fuel ventilation conduits. In this case as well, fuel vapor must be prevented from leaking into the environment.

Therefore, the object of the invention is to provide a crankcase ventilation, a tank ventilation conduit and a corresponding connection system for a fluid conduit, which in a secure manner can prevent any pollution of the environment due to a ventilation conduit not properly connected.

SUMMARY OF THE INVENTION

According to a first aspect, there is provided a crankcase ventilation for an internal combustion engine with a ventilation conduit which connects the crankcase of the internal combustion engine to an intake duct of the internal combustion engine, the ventilation conduit comprising: a first pipe connector, and a second pipe connector with a receiving chamber into which the first pipe connector or an insertion side end thereof is insertable, wherein a second groove is formed in the receiving chamber, and the first pipe connector has a first groove, wherein a compressible retaining ring is inserted into the first groove, the compressible retaining ring being engageable with the second groove when the first pipe connector is inserted into the receiving chamber, or an expandable retaining ring is inserted into the second groove, the expandable retaining ring being engageable with the first groove when the first pipe connector is inserted into the receiving chamber.

In the relaxed, i.e. non-compressed or non-expanded state, the retaining ring projects out of the first or second groove such that the retaining ring can snap into or engage the second or first groove by displacing the first pipe connector in the receiving chamber and correspondingly displacing the retaining ring to the second or first groove. In this way, the retaining ring ensures the connection state due to its engagement with both grooves. In other words, in both embodiments, the retaining ring in the relaxed state overlaps both with the diameter of the first groove and the second groove such that the retaining ring snapped into both grooves prevents any relative axial displacement of the two pipe connectors.

Preferably, the crankcase or an engine body in fluid communication therewith and/or the intake duct has a first pipe connector or a second pipe connector or is connected or connectable thereto.

Preferably, the retaining ring is made of heat-resistant plastic, such as PA12, PA6.12, PA6.10 or PPA, or steel wire.

According to a further aspect, there is provided a tank ventilation conduit for a motor vehicle, the tank ventilation conduit connecting a fuel tank to an activated-carbon container or an intake duct of the internal combustion engine or connecting an activated-carbon container to an intake duct of the internal combustion engine, the tank ventilation conduit comprising: a first pipe connector, and a second pipe connector with a receiving chamber into which the first pipe connector is insertable, wherein a second groove is formed in the receiving chamber, and the first pipe connector has a first groove, wherein a compressible retaining ring is inserted into the first groove, the compressible retaining ring being engageable with the second groove when the first pipe connector is inserted into the receiving chamber, or an expandable retaining ring is inserted into the second groove, the expandable retaining ring being engageable with the first groove when the first pipe connector is inserted into the receiving chamber.

According to a further aspect, there is provided a connection system for a fluid conduit containing fuel vapor or a combustion gas in a motor vehicle, in particular for a ventilation conduit for a crankcase ventilation of an internal combustion engine, a tank ventilation conduit, or a propulsion jet pump for generating negative pressure in a motor vehicle, the connection system comprising: a first pipe connector, and a second pipe connector with a receiving chamber into which the first pipe connector is insertable, wherein a second groove is formed in the receiving chamber, and the first pipe connector has a first groove, wherein a compressible retaining ring is inserted into the first groove, the compressible retaining ring being engageable with the second groove when the first pipe connector is inserted into the receiving chamber, or an expandable retaining ring is inserted into the second groove, the expandable retaining ring being engageable with the first groove when the first pipe connector is inserted into the receiving chamber.

More preferably, the retaining ring has a cone or a chamfer or insertion chamfer at a front end in the insertion direction and/or the receiving chamber has an insertion chamfer in order to facilitate the compression or the expansion of the retaining ring when the first pipe connector is inserted into the receiving chamber.

Preferably, at the first and second pipe connectors of the connection system or the crankcase ventilation, engagement means are arranged as rotation preventing means, in order to prevent a relative rotation of the first pipe connector with respect to the second pipe connector.

More preferably, at one of the first and second pipe connectors, biasing means are arranged in order to press the first pipe connector out of the receiving chamber when the first pipe connector is not properly inserted into the receiving chamber.

Preferably, at one of the first pipe connector and the receiving chamber, a radial sealing with an O ring or a shaped seal is arranged.

More preferably, the shaped seal has a sealing lip which is designed such that it is pressed against an inner circumference of the receiving chamber and/or against an outer circumference of the first pipe connector due to the acting fluid pressure.

Preferably, at least one of the first pipe connector and the second pipe connector is made of heat-resistant plastic, such as PA12, PA6.12, PA6.10 or PPA More preferably, the insertion chamfer is arranged such that before a compression of the radial seal, the retaining ring is compressed or expanded when the first pipe connector is inserted into the receiving chamber. In this way, the insertion force is reduced, as the compression or expansion of the retaining ring occurs with a time delay with respect to the compression of the radial seal. Thus, the maximum insertion force can be reduced significantly.

Preferably, the first pipe connector further comprises a collar which is insertable into an enlarged-diameter portion of the second pipe connector and which substantially completely enters into the enlarged-diameter portion in the completely coupled state. In this way, the state of complete connection can be detected easily by an installer as the collar completely enters into the enlarged-diameter portion and does not protrude therefrom any longer or is substantially flush with this portion.

More preferably, the collar is color-coded at its circumference, for example using signal red. This enables a much easier visual detection of the connection state.

A state of incomplete connection is thus quickly identified and any operation of the motor vehicle in this state and the corresponding pollution of the environment can be prevented in a secure manner.

The invention will now be explained with reference to one embodiment and its variants with reference to the accompanying drawings.

BRIEF DESCRIPTION OF THE DRAWINGS

FIGS. 1a and 1b show one embodiment of a connection system of a ventilation conduit in the coupled state, wherein FIG. 1a shows a sectional view and FIG. 1b shows a perspective view.

FIGS. 2a and 2b show the embodiment in the non-coupled state, wherein

FIG. 2a shows a sectional view and FIG. 2b shows a perspective view.

FIGS. 3a band 3b show a variant of the embodiment in a coupled state, wherein FIG. 3a shows a sectional view and FIG. 3b shows a perspective view.

FIGS. 4a and 4b show the variant of FIGS. 3a and 3b in the non-coupled state, wherein FIG. 4a shows a sectional view and FIG. 4b shows a perspective view.

FIGS. 5a and 5b show a further variant of the embodiment in the coupled state, wherein FIG. 5a shows a sectional view and FIG. 5b shows a perspective view.

FIGS. 6a and 6b show the variant of FIGS. 5a and 5b in the non-coupled state, wherein FIG. 6a shows a sectional view and FIG. 6b shows a perspective view.

FIGS. 7a and 7b show a further variant of the embodiment in the coupled state, wherein FIGS. 7a shows a sectional view and FIG. 7b shows a perspective view.

FIGS. 8a and 8b show the variant of FIGS. 7a and 7b in the non-coupled state, wherein FIG. 8a shows a sectional view and FIG. 8b shows a perspective view.

FIGS. 9a and 9b show a further variant of the embodiment in the coupled state, wherein FIG. 9a shows a sectional view and FIG. 9b shows a perspective view.

FIGS. 10a and 10b show the variant of FIGS. 9a and 9b in the non-coupled state, wherein FIG. 10a shows a sectional view and FIG. 10b shows a perspective view.

FIGS. 11a-11c show yet another variant of the embodiment in the coupled state, wherein FIG. 11a shows a sectional view and FIG. 11b shows a perspective view. Furthermore FIG. 11c shows a detailed view of FIG. 11a.

FIGS. 12a and 12b shows the variant of FIGS. 11a-11c in the non-coupled state, wherein FIG. 12a shows a sectional view and FIG. 12b shows a perspective view.

DETAILED DESCRIPTION OF THE PREFERRED EMBODIMENTS

With reference to the figures, one embodiment of the invention and its variants will be described in more detail. Here, in FIGS. 3a to 12b which show variants of the embodiment, for the sake of clarity, only those elements are provided with reference numbers, which are different from the elements of the embodiment. All other elements correspond to those of the embodiment.

The additional elements in the variants of FIGS. 3a to 12b may be combined freely to form further variants.

Although in the embodiment and its variants, a first pipe connector 10 is connected to a second pipe connector 20, the term "pipe connector" should be understood as a fitting which may be a further fluid conduit or a fitting connector of a further component, such as an intake conduit of an internal combustion engine. Furthermore, the pipe connector 10, 20 does not necessarily have a straight configuration, as shown in the figures, but may have any other shape or configuration, such as a 90° bend, a 30° bend, or any other bend. Furthermore, the pipe connectors 10, 20 may be configured as a manifold which includes a plurality of fluid ports.

Figure 1A:
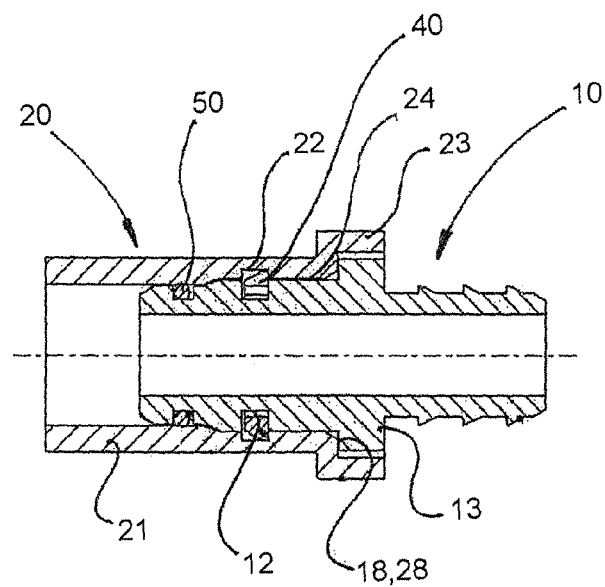
Figure 1B:
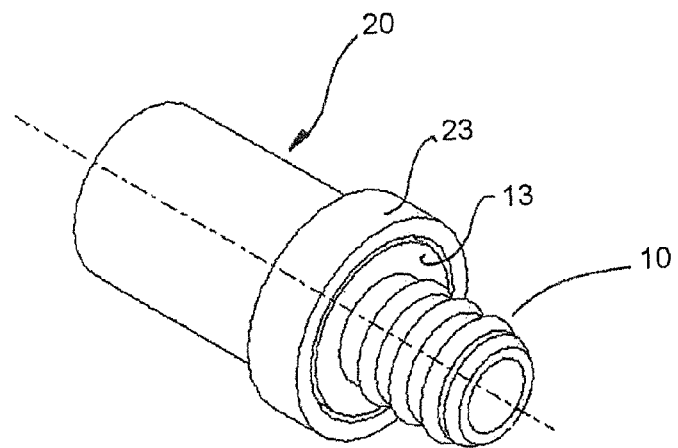
Figure 2A:
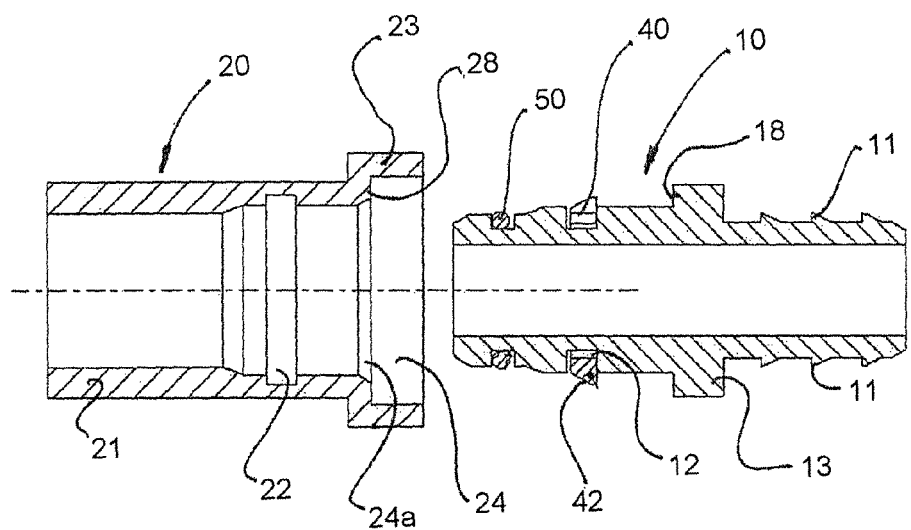
Figure 2B:
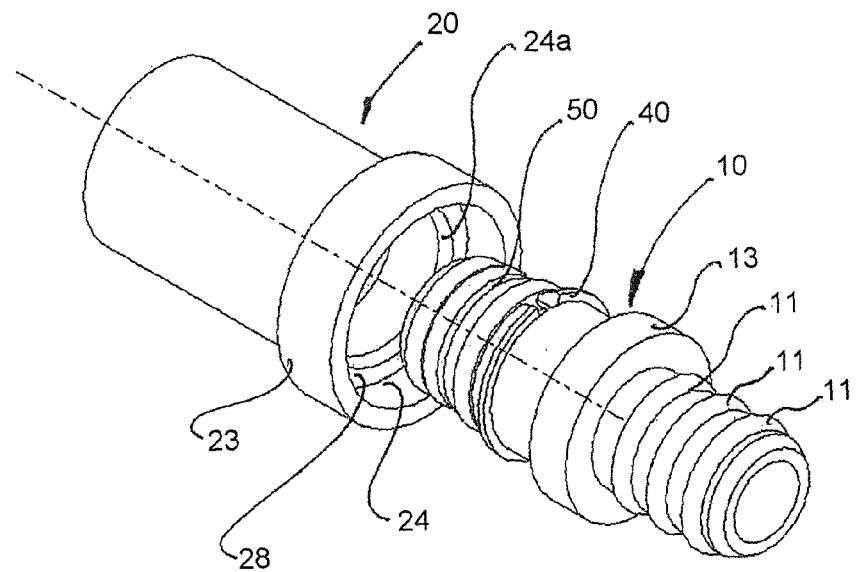

As shown in FIGS. 1a, 1b, 2a and 2c, the embodiment includes the first pipe connector 10 and the second pipe connector 20 which are to be connected to each other. To this end, the first pipe connector 10 has a first groove 12, into which a retaining ring 40 is inserted. The retaining ring 40 is, as shown in FIGS. 2a and 2b, formed as an open ring and projects out of the first groove 12.

The retaining ring 40 is compressable to an extent until its two open ends abut against each other. In this compressed state, the retaining ring 40 substantially does no longer project out of the first groove 12. At least in the compressed state of the retaining ring 40, its outer diameter is reduced such that the retaining ring is insertable into a receiving chamber 24 of the second pipe connector 20. In other words, an outer diameter of the compressed retaining ring 40 is equal to or less than an inner diameter of a reduced-diameter portion 21 of the second pipe connector 20. By compressing the retaining ring 40, the first pipe connector 10 can be inserted into the second pipe connector 20 to such an extent that the retaining ring 40, as shown in FIG. 1a, enters or snaps into a second groove 22 of the second pipe connector 20 by releasing the compressed state or by resilient relaxing into the initial position.

In the state of connection between the first pipe connector 10 and the second pipe connector 20, as shown in FIG. 1a, the conduit is completely connected and the connection state can only be removed by destroying the pipe connectors 10, 20 or the conduit. In particular, there is no possibility of compressing the retaining ring 40 which is relaxed into the second groove 22, manually or by means of a tool such that the coupled state of the pipe connectors 10, 20 can be removed. This is desirable, because in this way a disassembly of a fluid conduit that contains for example exhaust gas or fuel vapor, can be prevented in a secure manner in order to prevent a pollution of the environment with fuel vapors, oil mist or exhaust gases.

In order to facilitate an insertion of the first pipe connector 10 into the second pipe connector 20, the retaining ring 40 is preferably provided with a cone 42 and/or the receiving chamber 24 of the second pipe connector 20 is provided with an insertion chamfer 24a, as shown in FIG. 2a.

However, the invention is not limited to a retaining ring 40 with a compressible form.

Although not shown in the figures, it is evident for those skilled in the art that an expandable retaining ring prior to assembly, i.e. in the state shown in FIG. 2, can be inserted into the second groove 22, whereupon by inserting the first pipe connector 10 into the receiving chamber 24 of the second pipe connector 20, the retaining ring is expanded such that the retaining ring snaps into the first groove 12 of the first pipe connector 10 and thus establishes an undetachable connection.

In particular in both variants, the first pipe connector 10 is held in a secure manner in the second pipe connector 20 in that the retaining ring 40, which is compressable according to the embodiment, or an alternative expandable retaining ring (not shown) in its relaxed state engages both the first groove 12 and the second groove 22 in order to lock the first pipe connector 10 in the second pipe connector 20 in a secure manner.

Preferably, at one of the first and second pipe connectors 10, 20, a seal such as an O ring 50, is arranged in a further groove. As shown in FIGS. 1a and 2a, the O ring of this embodiment is received in a groove of the first pipe connector in order to form a radial seal with an inner circumference of the reduced-diameter portion 21 of the second pipe connector 20. However, a different type of seal can likewise be used. Alternatively, a groove for receiving an O ring can likewise be arranged in the second pipe connector 20 instead of the first pipe connector 10.

More preferably, the insertion chamfer 24a is arranged such that the retaining ring 40 is compressed or expanded during the insertion of the first pipe connector 10 into the receiving chamber 24 before the seal is compressed. In this way, the insertion force is reduced, as a compression or expansion of the retaining ring 40 occurs with a time delay with respect to the compression of the radial seal. Thus, the maximum insertion force can be reduced significantly.

This time-delayed deformation or compression/expansion of the retaining ring 40 and the seal is achieved by an appropriate axial spacing between the first groove 12 and the other groove in which the seal is arranged, in connection with an axial spacing between the insertion chamfer 24 at the inner circumference of the reduced-diameter portion 21. In other words, by engaging the insertion chamfer 24a, at first only the retaining ring 40 is compressed (expanded) during the insertion of the first pipe connector 10 into the receiving chamber 24 while the seal is axially spaced from the inner circumference of the reduced-diameter portion 21 and has thus not been compressed yet.

Only by further inserting the first pipe connector 10 in the axial direction after the retaining ring 40 is substantially completely compressed or expanded, the seal is radially compressed by engaging the inner circumference of the reduced-diameter portion 21 in order to fulfill its sealing function.

More preferably, the first pipe connector 10 has a collar 13 or an enlarged-diameter portion which is insertable into an enlarged-diameter portion 23 of the second pipe connector 20. In the completely coupled state shown in FIG. 1, the collar 13 enters substantially completely into the enlarged-diameter portion 23 in the coupled state. In this way, a properly coupled state can be detected visually.

In order to further facilitate the detection by an installer, the collar 13 can be color-coded, for example, using signal red at its circumference, such that the proper state can be detected in a way that the signal red circumference portion of the collar 13 is no longer visible when the fluid coupling or fluid conduit is completely connected.

As is further shown in FIGS. 1 and 2, the first pipe connector 10 has at its right end—as shown in the Figures—a portion which has sealing projections 11 and which is connectable to a hose. However, the invention is not limited thereto. The pipe connector 10 can likewise be formed as a complete or substantially complete ventilation conduit, or can integrally be formed at a corresponding component such as an intake filter body of an internal combustion engine, a cylinder head or a cylinder head cover, a tank, a container of an activated-carbon ventilation etc. The same applies to the second pipe connector 20.

Although the embodiment includes the enlarged-diameter portion 23, it should be evident for those skilled in the art that the enlarged-diameter portion 23 can likewise be omitted as this portion is no essential element of the fluid conduit or the connection system. In this case, the second pipe connector 20 has only the reduced-diameter portion 21, or in other words a substantially uniform outer diameter.

In such an embodiment, the first pipe connector 10 still has the collar 13 in order to provide an abutment in the form of a first abutment surface 18 at the collar 13 and a second abutment surface 28 at the insertion side end—right side in the figures—of the reduced-diameter portion 22 while inserting the first pipe connector 10 into the second pipe connector 20. However, the collar 13 can likewise be omitted. In this case, a proper connection can be detected by a click sound of the retaining ring 40 while entering into the second grove 22 or simply by pulling the first pipe connector 10 one more time away from the second pipe connector 20 in order to ensure that a mutual detachment of the pipe connectors 10, 20 is no longer possible due to the fact that the retaining ring 40 snaps into place.

It is also possible to omit a seal such as the O ring 50, when a front end—seen in the insertion direction—of the first pipe connector 10 has for example a press fit with respect to the inner diameter of the reduced-diameter portion 21. In this way, a sufficient sealing can be realized under certain circumstances without any separate sealing means.

Figure 3A:
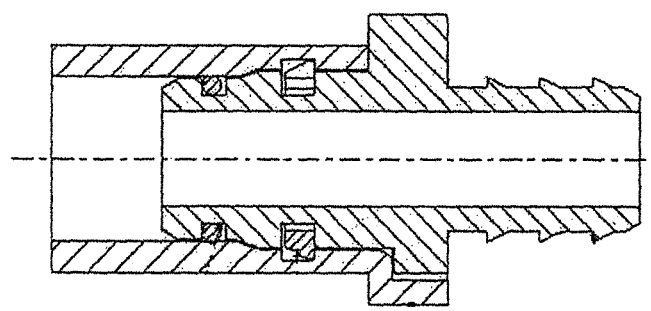
Figure 3B:
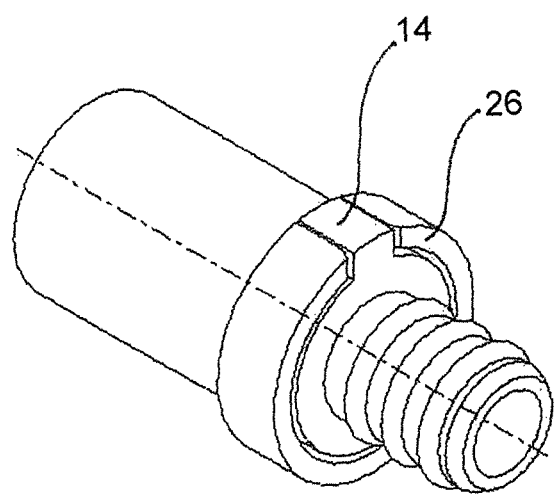
Figure 4A:
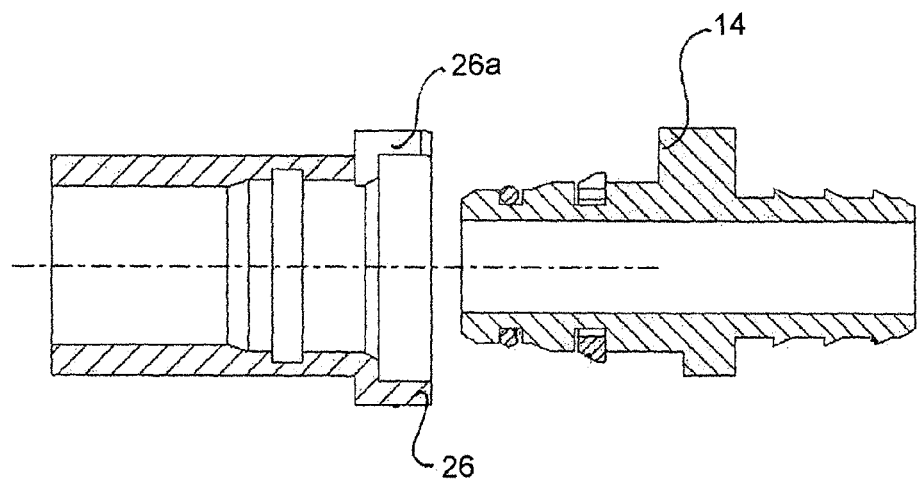
Figure 4B:
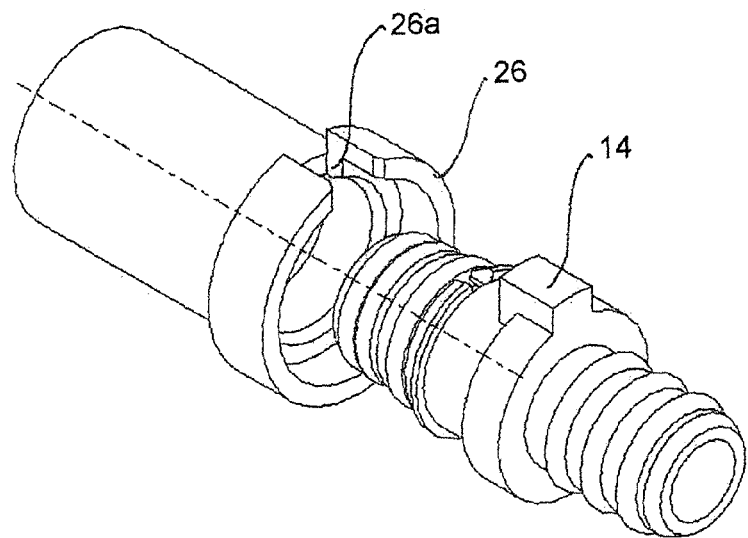

In the variant of the embodiment shown in FIGS. 3 and 4, the same elements are included as in the embodiment of FIGS. 1 and 2. However, the enlarged-diameter portion 23 additionally has at least one section 26*a*, into which a projection 14 at the collar 13 is insertable. In other words, in the variant of FIGS. 3 and 4, the enlarged-diameter portion 23 is formed as an interrupted pipe portion 26 with at least one section 26*a*. Corresponding to the section 26*a*, the collar 13 of the first pipe connector 10 has a radial projection 14 which is substantially completely insertable into the section 26*a* in the coupled state. In this way, a rotation preventing means is provided such that a mutual rotation of the pipe connectors 10, 20 is no longer possible in the coupled state. In this way, reliability and safety of the emission-prone fluid conduit can further be improved as in the upstream or downstream conduit, cracks, kinks, and the like due to mutual rotations of the pipe connectors 10, 20 can be prevented or avoided.

Figure 5A:
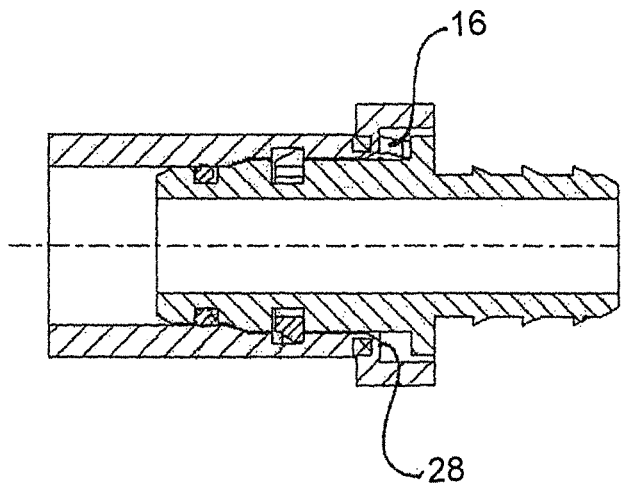
Figure 5B:
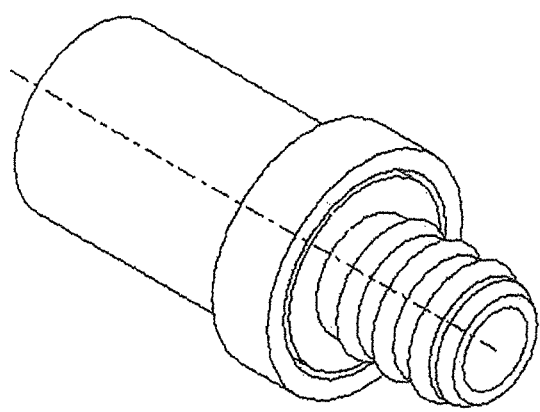
Figure 6A:
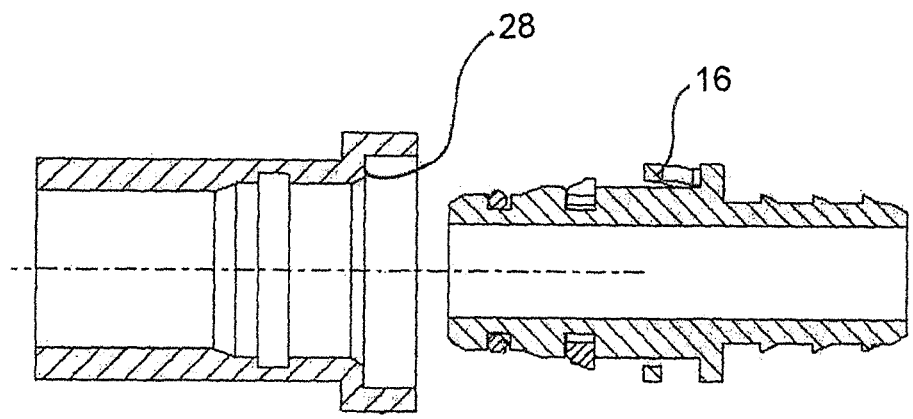
Figure 6B:
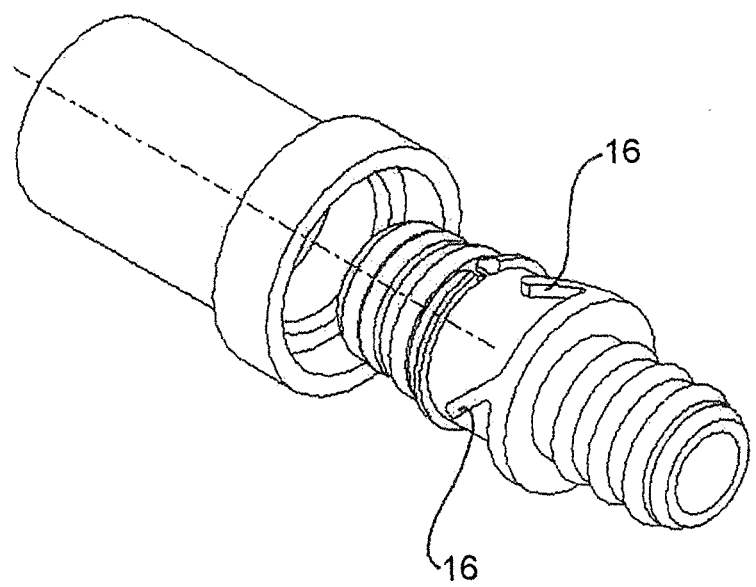

FIGS. 5 and 6 show one further variant of the embodiment, which can freely be combined with both the embodiment of FIGS. 1 and 2 and the embodiment of FIGS. 3 and 4. Here, the collar 13 at least has one resilient tab 16 which is preferably integrally formed at the pipe connector 10 and which is pushed against the second abutment surface 28 while inserting the first pipe connector 10. To this end, the resilient tab 16 has to be compressed in order to completely insert the first pipe connector 10 into the second pipe connector 20, until the retaining ring 40 snaps into place. If an installer does not insert the first pipe connector 10 into the receiving chamber 24 of second pipe connector 20 far enough, the resilient tab 16 ensures that the first pipe connector 10 is pressed out of the receiving chamber 24 again such that an incomplete connection state can be detected very easily. In this way, a pollution of the environment due to an incompletely mounted fluid conduit is prevented.

Preferably, a plurality of resilient tabs 16 is arranged substantially at equal angular intervals at the collar 13.

Figure 7A:
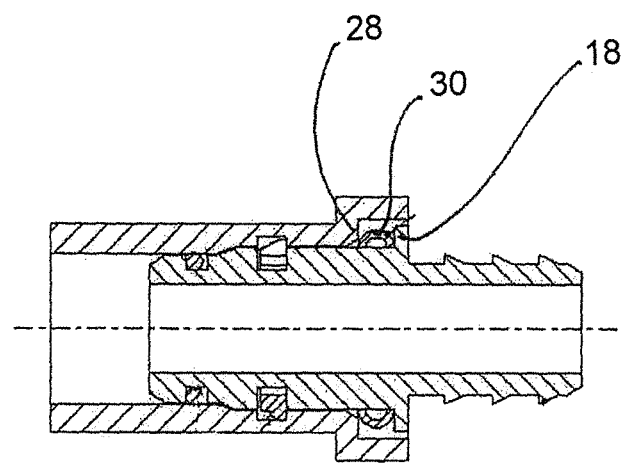
Figure 7B:
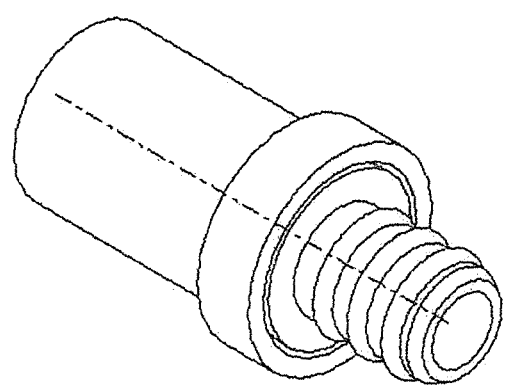
Figure 8A:
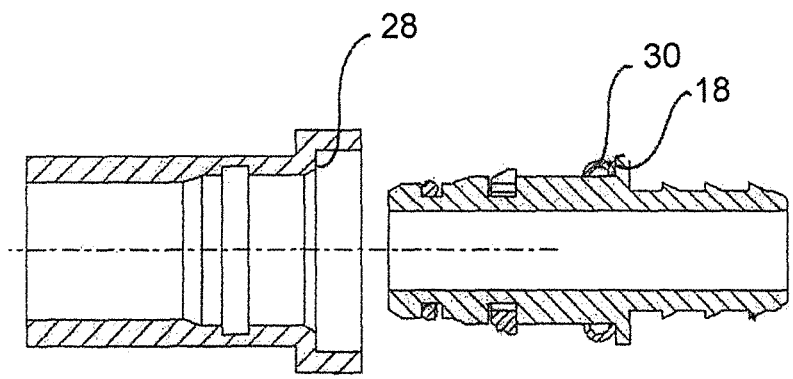
Figure 8B:
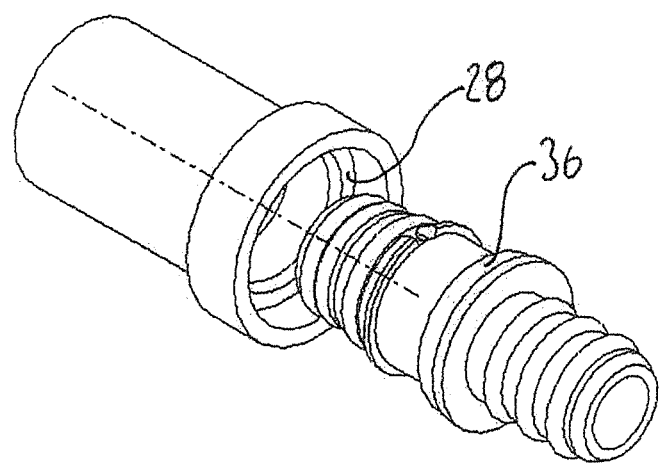

FIGS. 7 and 8 show one further variant of the embodiment in which the resilient tabs 16 are replaced with a separate spring element 30. The function is the same as that of the variant of FIGS. 5 and 6. It should be noted that instead of the resilient tabs 16 or in addition to the resilient tabs 16, the spring element 30 can be arranged.

Figure 9A:
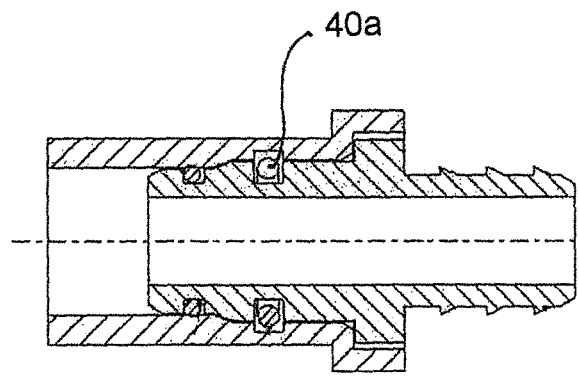
Figure 9B:
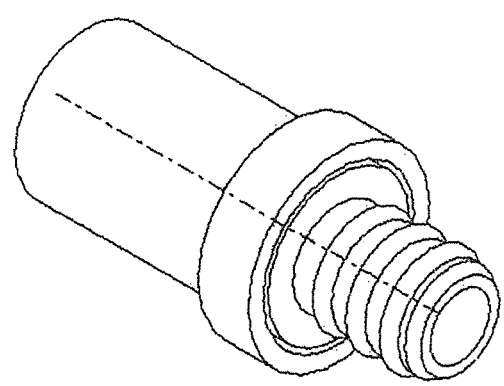
Figure 10A:
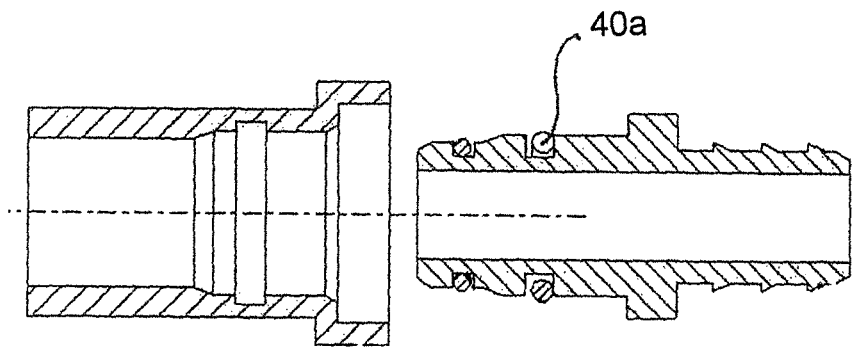
Figure 10B:
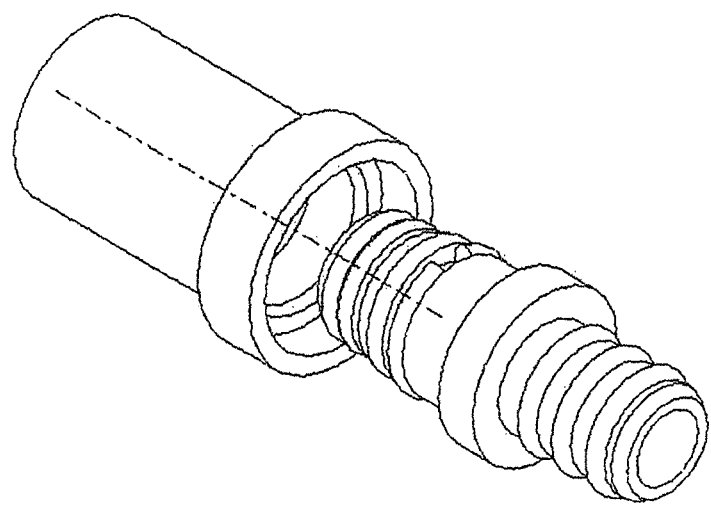

FIGS. 9 and 10 show one further variant of the embodiment in which the retaining ring 40 is replaced with a retaining ring 40*a* bent from a semi-finished product. In this case, the retaining ring 40*a* can easily be made of a semi-finished product without the necessity of manufacturing a separate component by injection molding or the like. For example, the retaining ring 40*a* can be bent and cut from a circular wire. However, the invention is not limited to the use of a circular wire. It can also be used a wire having a different cross-section such as a square cross-section. Furthermore, a square spring steel can be used for example.

Figure 11A:
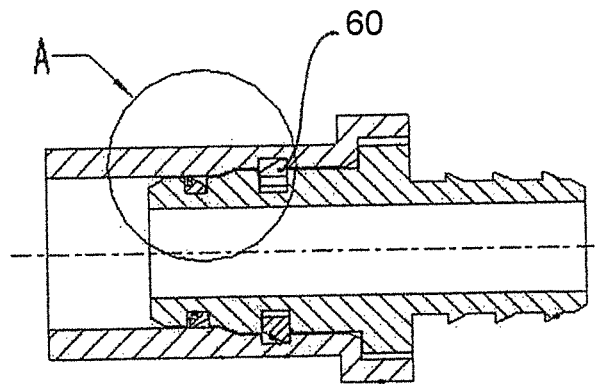
Figure 11B:
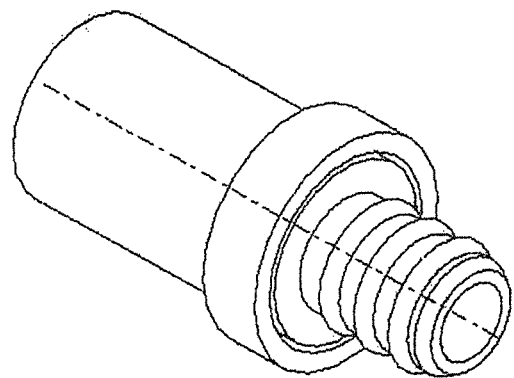
Figure 11C:
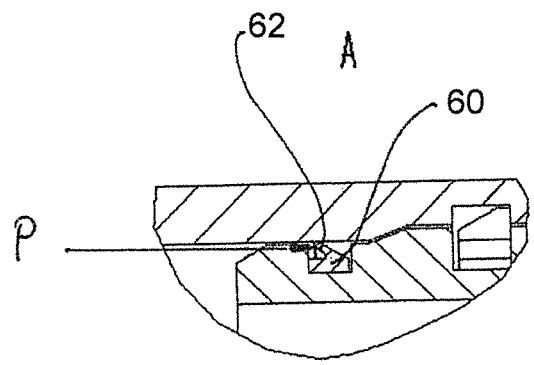
Figure 12A:
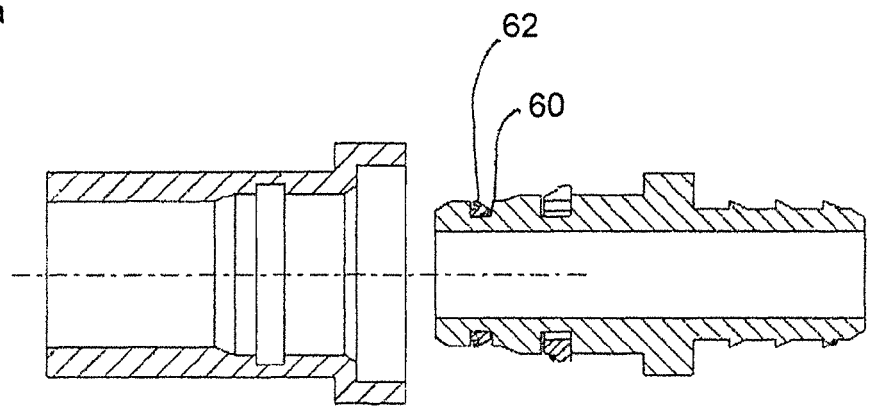
Figure 12B:
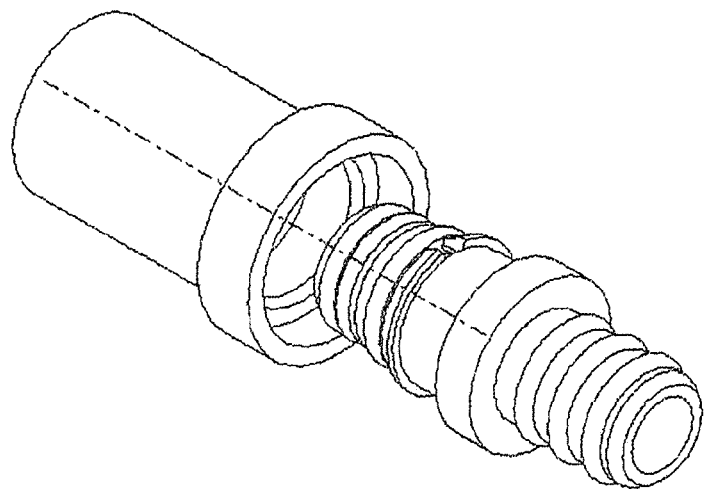

Finally, FIGS. 11 and 12 show a variant of the seal in the form of a shaped seal 60. The shaped seal 60 preferably has a sealing lip 62 which is shaped such that a pressure P acting in the fluid conduit P, as shown in FIG. 11*c*, acts against the sealing lip 62 in a way that the sealing lip 62 is pushed against the inner circumference of the reduced-diameter portion 21 of the second pipe connector 20. In this way, the sealing abilities or sealing features of the shaped seal 60 are all the more improved, the higher the acting fluid pressure P is. The shaped seal 60 may be used instead of the O ring 50 or in addition to the O ring 50. Furthermore, it is evident that the shaped seal 60 can also be combined with the retaining ring 40*a* which is bent from a semi-finished product.

Furthermore, the invention is not limited to a crankcase ventilation, but can also be applied to other fluid conduits in motor vehicles, in which a pollution of the environment is caused by a detached conduit.

Possible applications would be for example fuel conduits, fuel vapor conduits or coolant conduits of air conditioning systems of motor vehicles. In other words, the invention can for example be applied to a fuel tank ventilation, a fuel evaporation system with an activated-carbon container or the like.

Moreover, the invention is not limited to applications in the field of motor vehicles, but can also be applied in other technical fields.

The first pipe connector 10 and the second pipe connector 20 are preferably made of heat-resistant and acid-resistant plastic, such as PA12, PA6.12, PA6.10 or PPA. The retaining ring 40 is preferably also made of PA12, PA6.12, PA6.10 or PPA. Alternatively, the retaining ring 40 is made of steel wire. The shaped seal 60 is made of an elastomer, such as rubber, silicone, EPDM or the like.

However, other materials can also be used, such as metal materials or a combination of metal or thermoplastic materials.

The additional elements in the variants of FIGS. 3 to 12 can be combined freely to form other variants. For example, the variant with the interrupted pipe portion 26 and the projection 14 according to FIGS. 3 and 4 can be combined with all the variants according to FIGS. 5 to 12. Furthermore, the variant with the resilient tab 16 according to FIGS. 5 and 6 can be combined with the variants according to FIGS. 7 to 12.

Furthermore, the variant with the spring element 30 according to FIGS. 7 and 8 can be combined with the variants according to FIGS. 9 to 12. The variant with the modified retaining ring 40*a* according to FIGS. 9 and 10 can be combined with the variant according to FIGS. 11 and 12.

What is claimed is:

1. A crankcase ventilation for an internal combustion engine with a ventilation conduit that connects the crankcase of the internal combustion engine to an intake duct of the internal combustion engine, the ventilation conduit comprising:
   a first pipe connector (10) with an outer surface and a first groove (12) formed in the outer surface,
   a second pipe connector (20) with an outer surface and an inner surface defining a receiving chamber (24) into which the first pipe connector (10) is insertable,
   a second groove (22) formed in the receiving chamber (24) and having a depth less than a thickness of the second pipe connector (20) between the inner and outer surfaces, and
   a compressible retaining ring (40) inserted into the first groove (12) and being engageable with the second groove (22) when the first pipe connector (10) is inserted into the receiving chamber (24), or
   an expandable retaining ring-is inserted into the second groove (22) and being engageable with the first groove (12) when the first pipe connector (10) is inserted into the receiving chamber (24), whereby the retaining ring (40) is inaccessible when the first pipe connector (10) is inserted into the receiving chamber (24), thereby preventing separation of the first and second pipe connectors (10, 20).

2. The crankcase ventilation of claim 1, wherein the crankcase or an engine body in fluid communication therewith and/or the intake duct has a first pipe connector (10) or a second pipe connector (20) or is connected or connectable thereto.

3. The crankcase ventilation of claim 1, wherein the retaining ring (40) is made of heat-resistant plastic or steel wire.

4. The crankcase ventilation of claim 1, wherein the retaining ring (40) has a cone (42) at a front end in the insertion direction and/or the receiving chamber (24) has an insertion chamfer (24a) in order to facilitate the compression or the expansion of the retaining ring (40) when the first pipe connector (10) is inserted into the receiving chamber (24).

5. The crankcase ventilation of claim 1, wherein at the first and second pipe connectors (10, 20), engagement means (14, 26a) are arranged as rotation preventing means, in order to prevent a relative rotation of the first pipe connector (10) with respect to the second pipe connector (20).

6. The crankcase ventilation of claim 1, wherein at one of the first and second pipe connectors (10, 20), biasing means (16, 30) are arranged which press the first pipe connector (10) out of the receiving chamber (24) when the first pipe connector (10) is not properly inserted into the receiving chamber (24).

7. The crankcase ventilation of claim 1, wherein at one of the first pipe connector (10) and the receiving chamber (24), a radial sealing with an O ring (50) or a shaped seal (60) is arranged.

8. The crankcase ventilation of claim 7, wherein the shaped seal (60) has a sealing lip (62) which is designed such that it is pressed against an inner circumference of the receiving chamber (24) and/or against an outer circumference of the first pipe connector (10) due to the acting fluid pressure.

9. The crankcase ventilation of claim 1, wherein at least one of the first pipe connector (10) and the second pipe connector (20) is made of heat-resistant plastic, such as PA12, PA6.12, PA6.10 or PPA.

10. The crankcase ventilation of claim 1, wherein the insertion chamfer (24a) is arranged such that before a compression of the radial seal, the retaining ring (40, 40a) is compressed or expanded when the first pipe connector (10) is inserted into the receiving chamber (24).

11. The crankcase ventilation of claim 1, wherein the first pipe connector (10) further comprises a collar (13) which is insertable into an enlarged-diameter portion (23) of the second pipe connector (20) and which substantially completely enters into the enlarged-diameter portion (23) in the completely coupled state, wherein the collar (13) is preferably color-coded at its circumference.

12. A tank ventilation conduit for a motor vehicle, the tank ventilation conduit connecting a fuel tank to an activated-carbon container or an intake duct of the internal combustion engine or connecting an activated-carbon container to an intake duct of the internal combustion engine, the tank ventilation conduit comprising:
  a first pipe connector (10) with an outer surface and a first groove (12) formed in the outer surface, and
  a second pipe connector (20) with an outer surface and an inner surface defining a receiving chamber (24) into which the first pipe connector (10) is insertable,
  a second groove (22) formed in the receiving chamber (24) and having a depth less than a thickness of the second pipe connector (20) between the inner and outer surfaces, and
  a compressible retaining ring (40) inserted into the first groove (12),
  and being engageable with the second groove (22) when the first pipe connector (10) is inserted into the receiving chamber (24), or
  an expandable retaining ring-is inserted into the second groove (22) and being engageable with the first groove (12) when the first pipe connector (10) is inserted into the receiving chamber (24), whereby the retaining ring (40) is inaccessible when the first pipe connector (10) is inserted into the receiving chamber (24), thereby preventing separation of the first and second pipe connectors (10, 20).

13. The tank ventilation conduit of claim 12, wherein the retaining ring (40) has a cone (42) at a front end in the insertion direction and/or the receiving chamber (24) has an insertion chamfer (24a) in order to facilitate the compression or the expansion of the retaining ring (40) when the first pipe connector (10) is inserted into the receiving chamber (24).

14. The tank ventilation conduit of claim 12, wherein at the first and second pipe connectors (10, 20), engagement means (14, 26a) are arranged as rotation preventing means, in order to prevent a relative rotation of the first pipe connector (10) with respect to the second pipe connector (20).

15. The tank ventilation conduit of claim 12, at one of the first and second pipe connectors (10, 20), biasing means (16, 30) are arranged which press the first pipe connector (10) out of the receiving chamber (24) when the first pipe connector (10) is not properly inserted into the receiving chamber (24).

16. The tank ventilation conduit of claim 12, wherein at one of the first pipe connector (10) and the receiving chamber (24), a radial sealing with an O ring (50) or a shaped seal (60) is arranged.

17. The tank ventilation conduit of claim 16, wherein the shaped seal (60) has a sealing lip (62) which is designed such that it is pressed against an inner circumference of the receiving chamber (24) and/or against an outer circumference of the first pipe connector (10) due to the acting fluid pressure.

18. The tank ventilation conduit of claim 12, wherein at least one of the first pipe connector (10) and the second pipe connector (20) is made of heat-resistant plastic, such as PA12, PA6.12, PA6.10 or PPA.

19. The tank ventilation conduit of claim 12, wherein an insertion chamfer (24a) is arranged such that before a compression of the radial seal, the retaining ring (40, 40a) is compressed or expanded when the first pipe connector (10) is inserted into the receiving chamber (24).

20. A connection system for a fluid conduit containing fuel vapor or a combustion gas in a motor vehicle, in particular for a ventilation conduit for a crankcase ventilation of an internal combustion engine, a tank ventilation conduit, or a propulsion jet pump for generating negative pressure in a motor vehicle, comprising:
  a first pipe connector (10) with an outer surface and a first groove (12) formed in the outer surface, and
  a second pipe connector (20) with an outer surface and an inner surface defining a receiving chamber (24) into which the first pipe connector (10) is insertable,
  a second groove (22) formed in the receiving chamber (24) and having a depth less than a thickness of the second pipe connector (20) between the inner and outer surfaces, and
  a compressible retaining ring (40) inserted into the first groove (12) and being engageable with the second groove (22) when the first pipe connector (10) is inserted into the receiving chamber (24), or
  an expandable retaining ring inserted into the second groove (22) and being engageable with the first groove (12) when the first pipe connector (10) is inserted into the receiving chamber (24), whereby the retaining ring (40) is inaccessible when the first pipe connector (10) is inserted into the receiving chamber (24), thereby preventing separation of the first and second pipe connectors (10, 20).

* * * * *